Sept. 24, 1968   Y. F. VAN POPTA ETAL   3,403,396
AUTOMATIC TARGET TRACKING SYSTEMS
Filed Sept. 7, 1966   5 Sheets-Sheet 1

INVENTORS
YFTINUS F. VAN POPTA
JAN DIRK EHBEL
BY
AGENT

United States Patent Office 3,403,396
Patented Sept. 24, 1968

3,403,396
AUTOMATIC TARGET TRACKING SYSTEMS
Yftinus Frederik van Popta and Jan Dirk Ehbel, Hengelo, Netherlands, assignors to N.V. Hollandse Signaalapparaten, Hengelo Overijssel, Netherlands, a firm of the Netherlands
Filed Sept. 7, 1966, Ser. No. 577,647
Claims priority, application Netherlands, Sept. 14, 1965, 6511921
13 Claims. (Cl. 343—7.3)

ABSTRACT OF THE DISCLOSURE

An automatic tracking system for a pulse radar, in which the azimuth and range tracking circuits are provided with storage means for storing predicted target positions received from a digital computer and for storing actual target positions for application to the computer. The times of information exchange with the computer is determined by the computer. In the azimuth tracking circuit the storage means includes a counter in which both predicted and actual positions are stored, and the actual position signals are derived from the difference between the summed outputs of two halves of a shift register to which the video pulses are applied. In the range tracking circuit, the predicted and actual position signals are stored in separate counters, and the storage in the actual position counter may be the sum of a plurality of errors in order to compensate for erroneous signals.

---

The invention relates to automatic target tracking systems and more specifically to automatic target tracking systems of the type comprising a pulse radar apparatus with an aerial arranged for continuous rotation about a substantially vertical axis and means including a number of electronic digital arithmetic circuits and a gating circuit having an azimuth and a range gate, for keepng the target being tracked within a polar tracking frame. The center of the frame corresponds with the predicted azimuth and range of said target.

Systems of this type are known in various forms. The purpose of the invention is to provide a system of the above type which is distinguished from the known systems in a particularly favourable way by its simplicity, its accuracy and greater flexibility.

In accordance with the invention a system of the type described above comprises a computer consisting of said arithmetic circuits built together to form a unit a first feedback circuit is provided for connecting the output of said gating circuit to the azimuth gate thereof, and a second feedback circuit is provided connecting the output circuit of said gating circuit to the range gate thereof. The first and said second feedback circuits each include a digital selecting and discriminating circuit means. Angle and range predictions respectively and corrections can be mutually exchanged between the computer and the feedback circuits at times determined by the programming of the computer.

The invention is illustrated and explained in connection with the drawings accompanying this specification.

In the drawings:

FIG. 1 is a block-diagram illustrating the general principle of the system according to the invention;

FIG. 2 which is provided for purposes of explanation, shows part of the picture displayed on the screen of a plan position indicator;

FIG. 3 is a diagram corresponding to FIG. 1 and illustrating in greater detail a possible embodiment of the azimuth selecting and discriminating circuit as incorporated in the feedback circuit connected to the azimuth gate of the gating circuit;

FIG. 4 provides a schematic representation of two tracking frames containing a target and also shows a diagram for the purpose of explaining the discrimination effected by the digital azimuth selecting and discriminating circuit incorporated in FIG. 3;

Like references denote like parts in FIGURES 1, 3, 5 and 7.

Figure 1:
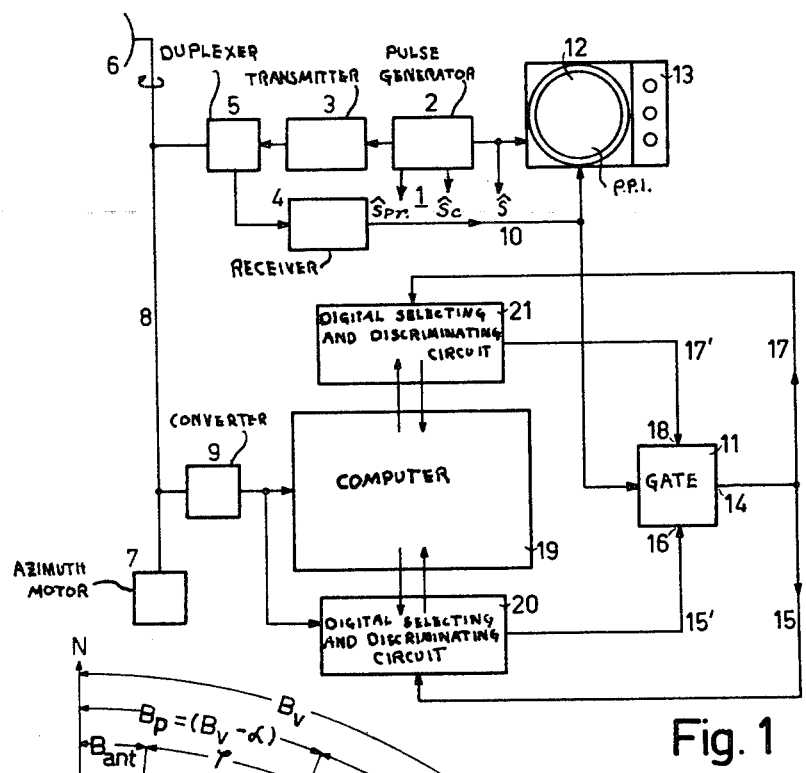
Figure 2:
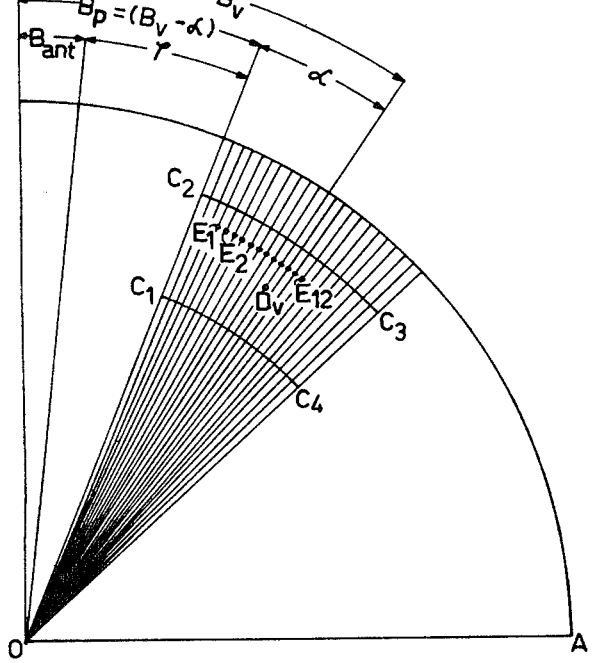

Referring to FIG. 1 there is shown a pulse radar apparatus 1 comprising a pulse generator 2, a transmitter 3 and a receiver 4. By way of a duplexer 5 the transmitter and the receiver are coupled with an associated aerial 6. Driven by an azimuth motor 7 this aerial rotates continuously about a substantially vertical axis 8. By way of an electromechanical coupling (not shown) the aerial is coupled with an aerial converter 9 supplying an aerial bearing pulse for each milliradian of rotation of the aerial. Said aerial is fed by the transmitter 3 with pulses of short duration occurring with such a pulse repetition frequency that several pulses are emitted per aerial beam width. Accordingly, since the radar apparatus is adapted to continuously scan the surrounding space, a number of echoes will be received from each target within the radar measuring range for each rotation of the aerial. These echo signals are detected in the receiver 4. The video signals which after detection occur at the output of the receiver 4 are fed by way of line 10 on the one hand to a gating circuit 11 and on the other hand to a plan position indicator 12 which forms part of a monitor 13. With the aid of this monitor an operator may select in known manner, one of the targets displayed on the screen of the plan position indicator. Such a selected target is subsequently kept within a polar tracking frame constituted by azimuth and range gates. Electronic digital arithmetic circuits are provided for controlling the moment of occurrence of the azimuth and range gates in such a way, that the center of the said polar tracking frame corresponds to the predicted azimuth and range of the target. This may be illustrated with reference to FIG. 2 which shows part of the picture displayed on a plan position indicator having a maximum measuring range of magnitude OA. The dots indicated with $E_1$, $E_2$ . . . $E_{12}$ represent the echo signals received from a single target. In number these echo signals correspond to the number of pulses transmitted per aerial beam width. In order to be able to compare the predicted position $D_v$ of the target with the true position of the target, as it is measured with the aid of the radar apparatus, a polar tracking frame $C_1$, $C_2$, $C_3$, $C_4$ is developed. The center of this frame corresponds with the predicted position $D_v$. The dimensions of this tracking frame are chosen such, that this tracking frame encompasses all echoes of the target, taking into account the relatively large prediction errors which may result from changes in course or variation in speed of the targets being tracked.

A particularly favourable and advantageous system of the type described is obtained according to the invention wherein the above mentioned digital arithmetic circuits are built together to form a computer 19. The system further comprises a first feedback circuit 15, 15', connecting the output 14 of the gating circuit 11 to the azimuth gate 16 thereof, and a second feedback circuit 17, 17' connecting the output 14 of said gating circuit to the range gate 18 thereof. The first and said second feedback circuit each include with a digital selecting and discriminating circuit means 20, 21. At times determined by the programming of said computer, angle and range predictions and corrections can be mutually exchanged between the computer and the feedback circuits. Since the computer 19 is not part of the feedback loops, it is free except for the short period in which it is operative to perform the necessary calculations for the required polar tracking frame. The system according to the invention thus has the important advantage, that the computer on a time sharing base can also be used to perform one or more other calculations for each aerial rotation, such as those related to, for instance, certain navigational and/or fire control problems.

As may be derived from their name, the digital selecting and discriminating circuits 20 and 21 have a double function, namely the selection of a certain part of the surrounding space, and the direct or indirect determination of the difference (discrimination) between the predicted and the true position of the target within the selected part of space. The selection (in the first function) is affected by azimuth and range gate control.

Figure 3:
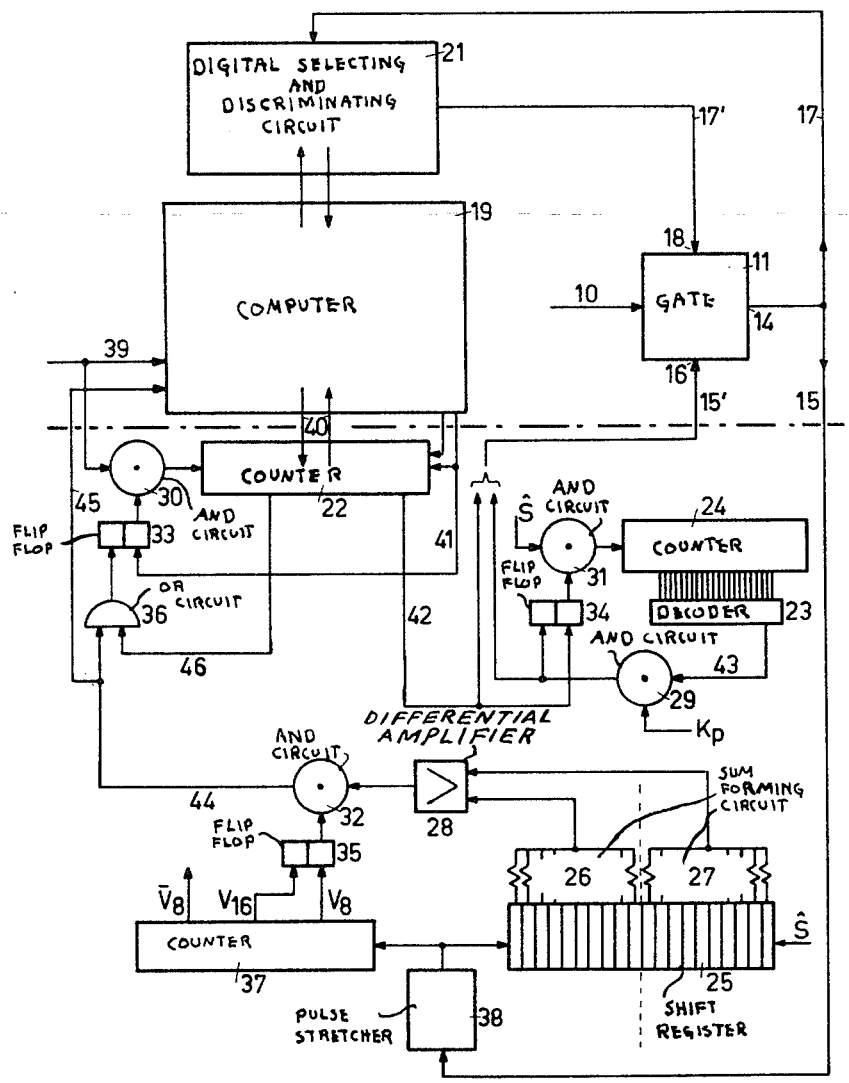

Referring to FIG. 3 it may be observed that this figure is divided into an upper and lower portion by means of a dashed-dotted line. The upper portion comprises the computer 19, the gating circuit 11 and the second feedback circuit 17, 17′, connected between the output 14 and the range gate 18 of this gating circuit. The second feedback circuit includes the (range-) selecting and discriminating circuit 21. The lower portion comprises the first feedback circuit 15, 15′ connected between the output 14 and the azimuth gate 16 of the gating circuit 11. The (azimuth-) selecting and discriminating circuit 20 included in this feedback circuit is shown in greater detail in FIG. 3. This circuit comprises a first digital counter 22, a second digital counter 24 with associated decoder 23, a shift register 25 the successive output terminals of which are divided into two equal groups. Each group of output terminals is connected by way of a sum forming circuit 26, 27 to a differential amplifier 28. This system further comprises four "and" circuits 29, 30, 31 and 32 respectively, the last three of which are controlled through the intermediary of associated flip-flop circuits 33, 34 and 35, an "or" circuit 36 and finally a third digital counter 37 and a pulse stretcher 38. The quantised (or nonquantised) video signals passed by the gating circuit 11 are fed by way of the pulse stretcher 38 on the one hand to said third digital counter 37 and on the other hand to said shift register 25. Said first digital counter 22 is herewith arranged for counting aerial bearing pulses which are furnished by the aerial converter 9 in FIG. 1 in synchronism with the clock-pulses supplied by the computer 19. These aerial bearing pulses are fed on the one hand to the computer 19 via line 39 and on the other hand to the first digital counter 22 via the "and" gate 30. The said first digital counter is further so arranged that for each aerial rotation it can be written-in or read out by the computer 19 at times determined by the computer. For the sake of simplicity the plurality of transfer leads by way of which this exchange of data flows has been represented symbolically by lines 40. The said second digital counter 24 is arranged for counting sync. pulses $\hat{S}$ which are supplied by the sync. pulse generator 2 (FIG. 1). These sync. pulses are fed to this counter via the "and" gate 31.

The operation of the selecting and discriminating circuit described above and the cooperation of this circuit with the computer will now be explained. It has been mentioned already that the azimuth direction of the rotating aerial is continuously recorded in the computer 19. By comparison of this recorded azimuth direction with the computer-predicted azimuth of the target the time can be determined at which the azimuth of the aerial will be equal to the azimuth at which the azimuth gate must be opened. This can be illustrated with reference to FIG. 2, in which the instantaneous azimuth of the aerial is represented by $B_{ant}$ and the predicted azimuth of the target is assumed to be equal to the angle $B_v$. The azimuth at which the gate must be opened is equal to $B_p = (B_v - \alpha)$, in which $\alpha$ represents the fixed angle the aerial covers in half the time the azimuth gate is open. As the predicted azimuth angle $B_v$ and the angle $\alpha$ are known, the angle $B_p$ can be calculated. Similarly as the azimuth of the rotating aerial $B_{ant}$ is known the angle $\varphi = B_p - B_{ant}$ can also be calculated. By having the computer now continuously, i.e., for each milliradian of rotation of the aerial, determine the angle $\varphi$, the time at which the angle $\varphi$ is equal to zero and hence, the azimuth gate should be opened, can be determined in a simple manner. Instead of performing this calculation continuously, i.e., each time for each milliradial of rotation of the aerial, in the case of the embodiment shown, this calculation is performed only a fixed number of times per aerial rotation, thus obtaining the marked advantage that the computer is considerably less burdened. For this purpose the angle of 360° covered per aerial rotation is divided into 8 successive substantially equal large sectors. The computer is programmed to determine the difference between the instantaneous azimuth of the aerial ($B_{ant}$) and the azimuth ($B_p$) at which the azimuth gate must be opened only at the beginning of scanning by the aerial in each sector. The computer is further programmed to apply an output pulse to line 41 only in the event that this angular difference ($\varphi$) is smaller or equal to 45°. When this pulse is applied to line 41, the said angular difference ($\varphi$) is written-in into the first digital counter 22 from the computer in the form of a negative digital number. The absolute magnitude of this negative digital number naturally corresponds with the number of aerial bearing pulses which will be produced by the aerial converter 9 during the time that the aerial covers the angle $\varphi$. The output pulse produced on line 41 is also fed to the flip-flop circuit 33 which is thereby brought in a first stable state. As a result the "and" gate 30 is opened to permit the bearing pulses to be fed to the counter 22. This counter counts in the forward direction and accordingly the negative number written-in into this counter will be reduced to the value zero after counting a number of aerial bearing pulses corresponding with the angle $\varphi$. On reaching the counting position zero this counter, while normally continuing counting, produces an output pulse. This output pulse is applied to the azimuth gate 16 by way of lines 42 and 15′, and causes the azimuth gate to be opened.

Recapitulating, it may be observed that with the method outlined, the computer determines the time at which the aerial starts covering the sector during which the azimuth gate should open, while the selecting and discriminating circuit with the aid of the computer-determined angle $\varphi$ fed to the first digital counter, determines the time in the sector at which the azimuth gate located within the sector concerned must be opened. The time at which the azimuth gate must be closed is also determined by the selecting and discriminating circuit. Since the number of pulses which are transmitted during the time the azimuth gate is open is a fixed number, the time at which the azimuth gate must be closed can be determined simply by counting the sync. pulses which occur from the moment the azimuth gate is opened till the moment this counter has reached a predetermined counting position corresponding to the fixed number of transmitted pulses that are required per azimuth gate. To this end, use is made of the second digital counter 24. The input of this counter is connected to the sync. pulse source by way of the normally closed "and" gate 31. In order to start the sync. pulse counting operation the output pulse produced by the first digital counter 22 is fed by way of line 42 to the flip-flop circuit 34. This permits the sync. pulses to be passed to the second digital counter 24, the moment the azimuth gate 16 is opened. Assuming now, that 24 radar pulses are to be transmitted (see FIG. 2) during the time interval that the azimuth gate is open, the second digital counter 24 on reaching a count of 24 sync. pulses, produces by way of its decoder 23 an output pulse on line 43. This output pulse is applied to the normally closed "and" gate 29 and causes the next clock pulse ($K_p$) to be fed to the azimuth gate 16 for closing this gate. The clock pulse is also applied to the flip-flop circuit 34 which effects the return of the "and" gate 31 to its normally closed state.

The first digital counter 22 which, as mentioned, opens the azimuth gate on reaching the counting position 0, continues to count the applied aerial bearing pulses, until it is stopped by an output pulse of the differential amplifier 28. Assume for the time being that the range selecting and discriminating circuit 21 to be described further below, in cooperation with the computer 19 is effective in producing a range gating pulse for each radar pulse transmitted. The detected (and if desired, quantized) echo signals of a target located within the part of space selected by these azimuth and range gates are fed by way of line 10 to the input of the gating circuit 11. These pulses will be passed to the range selecting and discriminating circuit 21 via line 17 and to the azimuth selecting and discriminating circuit 20 by line 15. In the azimuth selecting and discriminating circuit 20 these video signals, after having been stretched in the pulse stretcher 38, are fed to the third digital counter 37 and to the shift register 25. In view of the high pulse repetition frequency this shift register consists of a plurality of flip-flop circuits, these flip-flop circuits being in number preferably somewhat greater than the maximum number of echoes that can possibly be received from one target during one aerial rotation. In the embodiment here described this maximum number is equal to sixteen and the number of flip-flop circuits of the shift register is equal to 20. Depending on whether the successive radar pulses transmitted during the polar tracking frame result in the occurrence of an echo pulse or not, a "1" or "0" is added to the contents of the said shift register 25, and the contents already present in said shift register are shifted one place forward each time upon each receipt of an applied sync. pulse $\hat{s}$. The pulse stretcher 38 by lengthening the video pulses in a manner such that a second video signal or interference pulse, which may have been allowed to pass by the gating circuit during the occurrence of the same range gating pulse as the one which passes the first video signal, prevents another "1" from being added to the shift register as a result of the occurrence of this second video or interference pulse. Together with the two sum forming circuits 26 and 27 and the differential amplifier 28 connected thereto, this shift register forms a discriminator circuit. The said differential amplifier produces an output pulse on line 44, the moment the difference of the sum signals supplied to the amplifier in passing through zero changes its sign. Under certain conditions, which will be discussed below, this output pulse is used to stop the first digital counter 22. For this purpose, the said output pulse is fed by way of line 44 and the "or" circuit 36, to the flip-flop circuit 33 which is thereby set into a second stable state, and causes the "and" gate 30 to be closed, thus interrupting the flow of aerial bearing pulses to said first counter 22. The said output pulse of the differential amplifier 28 is also fed by way of line 45 to the computer 19, in order to inform the latter that the azimuth measurement has been completed and that therefore the digital number present in the counter 22, which digital number contains the required information regarding the position of the center of the target, may be read out.

For the purpose of illustration reference may be had to the FIGURES 4a, 4b and 4c. The FIGS. 4a and 4c each schematically represent a tracking frame in which the radar pulses transmitted at the times numbered from 1 to 24 are indicated by vertical lines. The dashes indicated in FIG. 4a by $E_1$ through $E_{12}$ represent twelve echoes of a target $D_1$, whose center, as may be derived from this figure, shows a deviation to the left with respect to the center of the tracking frame, said center of the frame being the predicted position of the target. The dashes indicated in FIG. 4c by $E_1$ through $E_8$ represent eight echoes of a target $D_2$ whose center shows a deviation to the right. FIG. 4b is a graph representing the difference of the sum signals as produced at the output of the differential amplifier 28. The stepped curve designated $V_{D_1}$ is the graph associated with the target $D_1$ represented in FIG. 4a, while the stepped curve designated $V_{D_2}$ shows a similar graph for the target $D_2$ represented in FIG. 4c. The graph $V_{D_1}$ shows that the said difference, from the time $t_4$ at which the first echo pulse from the target $D_1$ is received, is continuously increasing in a step-wise manner until the time $t_{13}$, at which the tenth echo pulse of the target $D_1$ is received. At this time the first half of the shift register contains ten successively register ones, while the other half of the said shift register contains only zeros. At this time therefore, as illustrated by the figure, the said difference is greatest.

Figure 4:
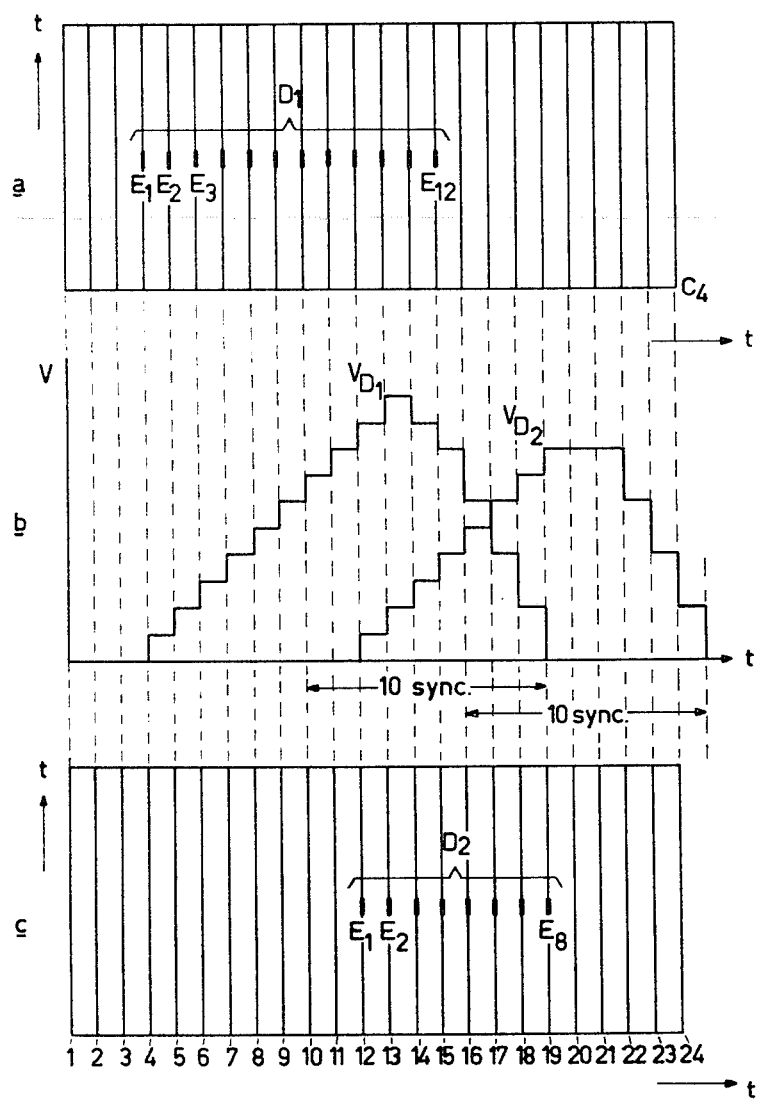

At the time $t_{15}$ the one half still contains ten ones, whereas the other half contains two ones, so that the difference is now decreasing. After the time $t_{15}$ no echo signals are received any more and therefore only zeros are applied to the shift register. This means that from the time $t_{15}$ on the difference is rapidly decreasing, as for each sync. pulse fed to the said shift register to contents of the one half of said shift register are decreased by "1," while the other half of the shift register is increased by "1." At the time $t_{19}$ both halves of the shift register contain an equal number, viz. "6" ones and therefore the difference is zero. With the next sync. pulse supplied to the shift register at the time $t_{20}$, the difference passes through zero and accordingly the differential amplifier 28 produces the said output pule which stops the first digital counter 22. After the above explanation the manner in which the stepped curve $V_{D_2}$ is obtained, will no doubt be clear. FIG. 4b illustrates the discriminator action of the circuit in that it shows that the time at which the difference, in passing through zero, changes its sign and the differential amplifier 28 produces its output pulse, is directly dependent on the position of the target. FIG. 4 further shows that from the time the azimuth direction of the aerial corresponds with the azimuth direction of the center of the target, a certain fixed time interval elapses, before the output pulse of the differential amplifier occurs. This delay is always equal to the time in which $n/2$ sync. pulses occur, where $n$ represents the number of flip-flop circuits of said shift register. In the present embodiment the number of flip-flop circuits is twenty and the delay therefore is equal to the time in which ten sync. pulses occur. As may be derived from FIG. 4 this delay is not influenced in any way by the number of echo pulses received from a target. During the time of ten sync. pulses the aerial covers a fixed azimuth angle which for purposes of correction is deducted in the computer from the azimuth angle which is supplied to the computer by the counter 22. For the target of FIG. 4a, the angle thus obtained after correction is equal to the angle the aerial has covered in the time interval which extends from $t_1 - t_{10}$. The computer now determines the deviation with respect to the predicated azimuth position of the target by deducting the fixed angle $\alpha$ in FIG. 2 from the aforementioned angle that is covered in the time interval which extends from $t_1 - t_{10}$.

It has already been mentioned above that the output pulse of the differential amplifier 28 will only then be supplied to the flip-flop circuit 33, if certain conditions have been met. These conditions are that the target concerned should be represented by at least eight and at the most sixteen video signals. The third digital counter 37 determines whether these conditions have been met or not. For this purpose the counter 37 is arranged to count the number of video signals supplied to the shift register and to produce an output pulse on line $V_8$ the movement it has counted up to eight video signals. The output pulse thus produced is applied to the flip-flop circuit 35 which is thereby sent to a first stable state, in which it opens the normally closed "and" gate 32, so that a possibly occurring output pulse of the differential amplifier 28 will be allowed to pass. However, the moment this counter ascertains that more than sixteen video signals are supplied to the shift register 25, it produces an output pulse on line $V_{16}$ which applied to the flip-flop circuit 35 sends the latter to a second stable state, in which it causes the "and" gate 32 not to pass any output pulse that might occur at the output of said differential amplifier 28. In that case the counter 22 is stopped automaticallly, in that on reaching a certain counting position it produces on line 46 an output pulse which by way of the "or" circuit 36 is applied to the flip-flop circuit 33, as a result of which the "and" gate 30 is closed, so that the aerial bearing pulses are no longer allowed to pass to the counter 22. The information (digital number) in that case present in the counter does not relate to a measurement and therefore, due to the fact that the signal "measurement completed" normally given via line 45 fails to appear, the computer is warned not to take over this information.

Figure 5:
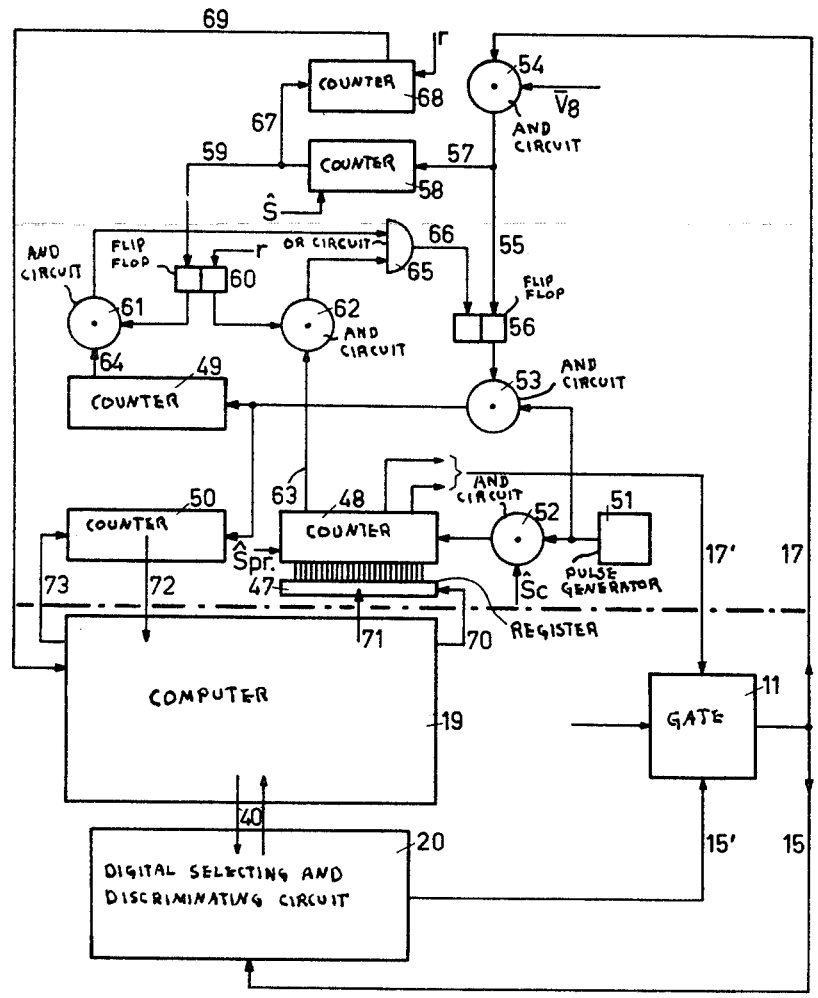
FIG. 5 is a diagram corresponding to FIG. 1 illustrating in greater detail an embodiment of the range selecting and discriminating circuit which is incorporated in the feedback circuit connected to the range gate of the gating circuit.

Referring now to FIG. 5, it may be observed that this figure is again divided into an upper portion and a lower portion by means of a dashed dotted line. The lower portion comprises the computer 19, the gating circuit 11 and the first feedback circuit 15, 15' including said azimuth selecting and discriminating circuit 20. The upper portion comprises the second feedback circuit 17, 17' showing in greater detail the range selecting and discriminating circuit 21 included in this feedback circuit. The range selecting and discriminating circuit comprises a register 47, a first, a second, and a third digital counter designated 48, 49 and 50 respectively, and a pulse generator 51 producing range counting pulses. These range counting pulses are supplied on the one hand to the first digital counter 48 via a first "and" gate 52 and on the other hand to said second and third digital counters via a second "and" gate 53. The circuit is further provided with an "and" gate 54 via which the video signals passed by the gating circuit 11 are supplied on the one hand via line 55 to a flip-flop circuit 56 controlling the "and" gate 53, while these video signals on the other hand are supplied via line 57, to a device 58 for ascertaining if a certain condition to be mentioned below is met. Via line 59 the output of the device 58 is connected to a flip-flop circuit 60 controlling the "and" gate designated 61 and 62. The "and" gates 61 and 62 are controlled by the said flip-flop circuit 60 in a manner such that dependent on whether this flip-flop circuit is in its first or in its second stable state, either the one or the other of said "and" gate is opened, so that dependent on the stable state this flip-flop circuit is in, either the second counter 49 or the first counter 48 will be connected to the "or" circuit 65. The output of circuit 65 is connected to the flip-flop circuit 56 by line 66. The output of the device 58 is also connected via line 67 to the input of a device 68 for ascertaining, if a second condition to be mentioned below is met. Via line 69 the output of the device 68 is connected to the input of the computer 19.

The operation of this range selecting and discriminating circuit and the cooperation of this circuit with the computer will now be explained. The range counting pulses produced by generator 51 each represent a fixed range increment the size of which is determined by the pulse repetition frequency of the range counting pulses. In the embodiment here described this pulse repetition frequency is 4.79 mc./sec. The time interval between two successive range counting pulses is then about 0.21 μsec., each range counting pulse thus representing a range increment of 31.25 m. At a time determined by the computer 19, for instance in the time interval in which the aerial covers the angle $\varphi$ in FIG. 2, the register 47 receives a control pulse, which is produced by the computer and is fed to the said register by line 70. This control pulse causes the register to take over, via the symbolically represented transfer leads 71, a positive digital number furnished by the computer.

Figure 6:
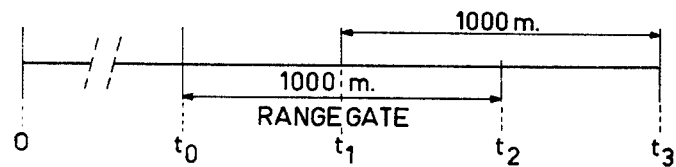
FIG. 6 shows a diagram for the purpose of explaining the operation of the range selecting and discriminating circuit incorporated in the embodiment of FIG. 5.

This positive digital number corresponds with the predicted range A increased by a range of 500 m. (=½ range gate) expressed in range increments. To the first digital counter 48 there are supplied presync. pulses $\hat{S}pr$. which are produced by the sync. pulse generator 2 and precede the sync. pulses $\hat{S}$ produced by this generator. Each time such a presync. pulse occurs the counter 48 takes over the positive digital number from the register 47. The counter 48 is arranged to count backwards so that its contents are decreased by one for each range counting pulse applied to this counter. It starts counting the moment a correction sync. pulse $\hat{S}c$ is applied to the "and" gate 52. The correction syn. pulses $\hat{S}c$ are produced by the sync. pulse generator 2, and occur 6.6 μsec. (=1000 meters) before sync. pulse $\hat{S}$ appears. Thus started, this difference of 6.6 μsec. causes the digital number in the counter 48 to be reduced to the value zero at the moment $t_0$ in FIG. 6. At this instant the counter 48 produces an output pulse which via line 17' is applied to the gating circuit 11, to open the range gate thereof. The counter 48 continues to count backwards and on reaching a negative digital number corresponding with 32 range counting pulses (=1000 meters) it produces at the time $t_2$ a second output pulse, which, fed to the gating circuit 11, causes the range gate to be closed. On reaching a negative digital number corresponding with 48 range counting pulses, the counter 48 produces on line 63, at the time $t_3$, a third output pulse which is used as a switching pulse. The second digital counter 49 and the third digtial counter 50 start counting range counting pulses the moment the gating circuit 11 passes a video signal. Via line 17, "and" gate 54 and line 55 this video signal is fed to flip-flop circuit 56 which thereby is sent to a stable state in which it causes the "and" gate 53 to pass the range counting pulses of pulse generator 51 to both the second and the third counter.

Assuming now that the "and" gate 62 passes the switching pulse which occurs at the time $t_3$ at the output 63 of the counter 48, this switching pulse is fed via the "or" circuit 65 and line 66 to the flip-flop circuit 56, which as a result is set to a second stable stae causing the "and" gate 53 to close, so that the range counting pulses are no longer applied to the counters 49 and 50. The digital number present in counter 50 will then correspond with the number of range counting pulses counted between the moment the video signal appears and the moment that the switching pulse occurs, i.e., the range between the target and the end of the range gate+500 meter. For a video signal occurring at the time $t_1$ and thus (see FIG. 6) situated in the centre of the range gate, the digital number present in the counter 50 corresponds at that moment with 32 range counting pulses which represents 1000 meters. A deviation, if any, with respect to the centre of the range gate can therefore be determined in computer 19 by deducting from the digital number present in said counter, a digital number corresponding with 32 range counting pulses For targets situated in the centre of the range gate this produces the value zero. If after deduction there is a positive or a negative remainder, this remainder is a measure of a corresponding deviation backwards or forwards with respect to the centre of the range gate. Naturally the result of one single range measurement cannot be more accurate than the size of a range increment being 31.25 meters. In order to obtain a more accurate result, the range counting pulse generator 51 of the circuit here described is not synchronized with the sync. pulses and instead of one single range measurement eight range measurements are performed of which the average value is determined. For this purpose the contents of the counter 50 corresponding with the sum total of said eight range measurements are divided by eight. This is realised in a simple way by taking the originally fourth counter stage for the last significant digit when the counter 50 in response to a control pulse on line 73 is read out via the schematically represented transfer leads 72. As can be shown mathematically, the achieved accuracy of the range measurement is improved by a factor $\sqrt{8}$. In connection with the foregoing the number of range measurements performed during the time the azimuth gate is open has to be limited to eight. This is effected by means of the "and" gate 54 which is kept open by the signal V8, (derived from the video counter 37 in FIG. 3) until the gating circuit 11 has passed eight video signals. The way of range measuring described, whereby the range counter 50 starts its counting operation on receipt of a video signal passed by the gating circuit 11, is particularly advantageous since it reduces inaccuracies which may occur as a result of a second video being passed by one and the same range gate. For in that case chances are that the second video signal comes from a selected target, whereas the first video signal is caused by an interference pulse. Both counters 49 and 50 would then be started too early. In order to prevent this from influencing too strongly the average range error as determined after eight measurements, the range counter 50, in the case of a second video signal occurring, is stopped at the counting position corresponding with 32 range counting pulses or 1000 meters. This means, that for this one measurement the target does not show a deviation with respect to the centre of the range gate. This is accomplished with the aid of the second digtial counter 49 in co-opeartion with the device indicated by 58 consisting of a counter which each time a sync. pulse occurs is reset to zero. The second digital counter 49 is arranged so, that on reaching a counting position corresponding with 32 range counting pulses (=1000 meters), it produces an output pulse on line 64. If now, the device 58 by counting the number of video signals which occur per range gate on line 57 determines that more than one video signal occurs, it produces on line 59 an output pulse which set the flip-flop circuit 60 to a stable state, in which it causes the "and" gate 61 to be opened. This "and" gate then passes the output pulse of the second digital counter 49 via the "or" circuit 65 and line 66 to the flip-flop circuit 56, which as a result is sent to a stable state in which it causes the "and" gate 53 to be closed. As a result of this both counters 49 and 50 stop at a counting position corresponding with said 32 counting pulses (=1000 meters). It appears that by using the above described method, the inaccuracy occurring as a result of a double video, becomes inadmissibly large only, if a double video occurs at least three times per eight successive range measurements. Only then is the average value obtained after division by eight not reliable anymore. In that case the computer should be warned not to take over this useless final result. In this connection the output pulse occurring at the output of the device 58, is also fed by way of line 67 to the device 68, which also consists of a counter. Every time prior to the instant at which the azimuth gate is opened this counter is reset to zero; this counter being further so arranged, that on receipt of a third output pulse of the device 58, it produces an output pulse which fed to the computer via line 69 reports "measurement useless."

Figure 7:
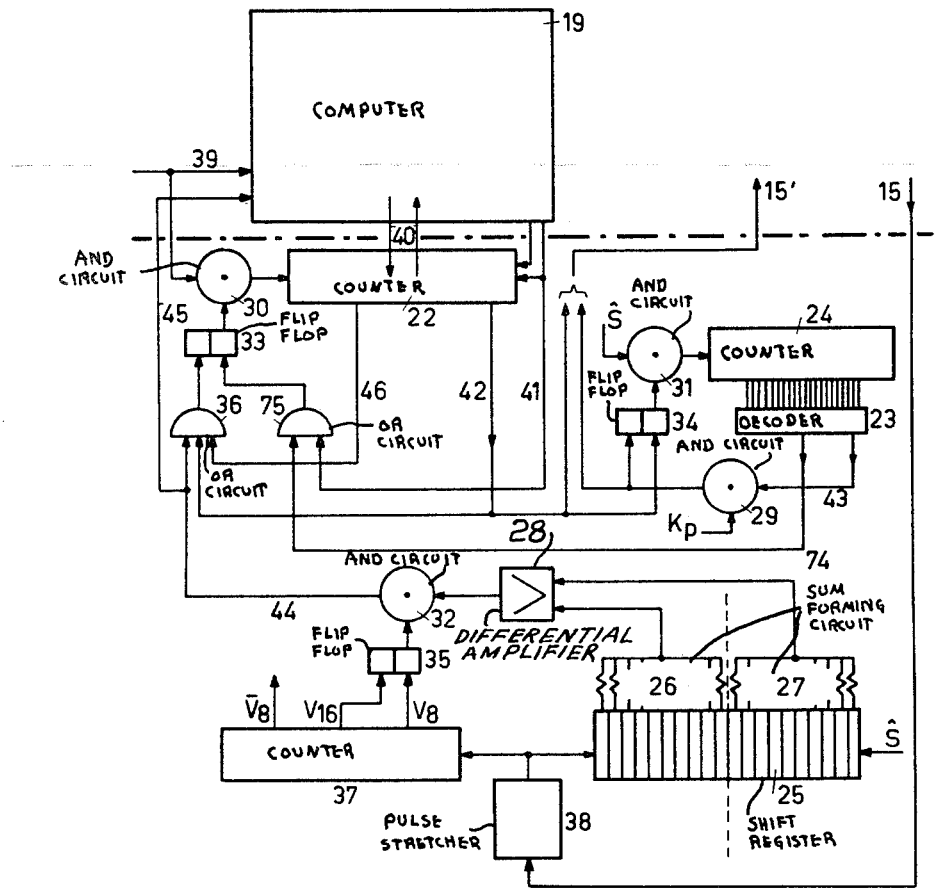
FIG. 7 shows a minor modification of the azimuth selecting and discriminating circuit incorporated in the embodiment of FIG. 3.

FIG. 7 shows another possible embodiment of the selecting and discriminating circuit 20 included in the feedback circuit 15, 15'. This embodiment resembles the circuit shown in FIG. 3. It is distinguished, however, from this circuit by the manner in which it effects the correction required by the fact that the output pulse of the differential amplifier 28 as regards its time of occurrence is delayed with respect to the time the azimuth direction of the aerial corresponds with the azimuth direction of the center of the target. As explained above, this delay is always equal to the time at which $n/2$ sync. pulses occur, where $n$=the number of flip-flop circuits of the shift register 25.

Recapitulating it may be observed that in connection with this delay the embodiment shown in FIG. 3 effects correction required by means of the computer 19, wherein the final result taken over from the counter 22 is reduced by a fixed angle corresponding with the angle the aerial covers in the time interval corresponding with the said delay. In the embodiment shown in FIG. 7 this correction is not performed in the computer but instead thereof it is effected during the measurement by stopping the counting operation of the counter 22 for a time interval corresponding with said delay. For this purpose use is made of the output pulse which by the counter 22 is produced on line 42. This output pulse, which causes the azimuth gate to be opened and the sync. pulse counter 24 to be started is supplied via the "or" circuit 36 to the flip-flop circuit 33 which as a result is set to a stable state in which it causes the "and" gate 30 to cut-off the supply of aerial bearing pulses to counter 22. Assuming the delay to be equal to a time interval of ten sync. pulses (see FIG. 3), the sync. pulse counter 24 produces by way of its decoder 23 an output pulse having counted 10 sync. pulses. Via line 74 and the "or" circuit 75 this output pulse is fed to the flip-flop circuit 33, which as a result resumes its original stable state in which it causes the "and" gate 30 to allow the aerial bearing pulses to pass again to the counter 22. It will be clear that the temporary stopping of counter 22 during the measurement is similar to the deduction of an azimuth angle. The embodiment shown in FIG. 7 has the important advantage that this azimuth angle varies in accordance with changes in PRF, if any. It is thereby achieved, that the deducted azimuth will always be adapted to the said delay and therefore effect the proper correction even if the said delay varies owing to a drift in PRF of the sync. pulses controlling the said shift register.

It may here be observed that the inquiry into the magnitude of the angle $\varphi$ carried out sector by sector in the computer, need in no way be limited to eight times per aerial rotation. Finally it will be understood, that the computer can also be programmed in such a way that the angle $\varphi$ transferred from the computer to the first digital counter is equal to the angle which the aerial at the computer-determined time instant has still to cover before the azimuth of the aerial corresponds with the azimuth director of the centre of the azimuth gate increased by the angle the aerial covers in an interval determined by $n/2$ sync. pulses, where $n$ is the number of flip-flop circuits of said shift register. In such an embodiment of the system according to the invention the counting position of the first digital counter 22, for a target the azimuth of which does not show a deviation with respect to the predicted azimuth position, will be exactly zero at the moment this counter is stopped by an output pulse of the differential amplifier 28. Hence, in case of a possible deviation with respect to the predicted position, the magnitude of this deviation is immediately represented by the contents of the first digital counters (digital number larger or smaller than zero). This counter, however, must then be able to count forward and backward which is not needed in the previous embodiment.

We claim:

1. An automatic target tracking system of the type including a pulse radar apparatus having an aerial adapted for continuous rotation about a vertical axis, and gate means connected to gate video signals to keep a target being tracked within a polar target frame having a center corresponding to predicted azimuth and range coordinates of said target; wherein the improvement comprises a digital storage means connected to the output of said gate means, a digital computer connected to said storage means for receiving therefrom first digital signals corresponding to the actual position of said target on a given coordinate, said computer including means for applying second digital signals corresponding to a predicted position on said target along said coordinate to said storage means only once for each rotation of said aerial, a source of a periodic signal having a period corresponding to a predetermined increment of variation of said coordinate, said periodic signal being applied to said storage means, said storage means being responsive to said application of said second digital signals to compare said second signal with said periodic signal to produce a gating signal for said gate means, and means responsive to video signals passed by said gate means for storing said first digital signals in said storage means.

2. An automatic target tracking system of the type including a pulse radar apparatus having an aerial adapted for continuous rotation about a vertical axis, a source of azimuth pulses, and azimuth and range gate means connected to gate video signals to keep a target being tracked within a polar tracking frame having a center corresponding to predicted azimuth and range coordinates of said target, wherein the improvement comprises azimuth digital storage means, range digital storage means, a digital computer connected to said range and azimuth storage means, means applying said azimuth pulses to said computer whereby said computer applies digital signals corresponding to a predicted azimuth and range of said target to said azimuth and range storage means only when a predetermined relationship exists between the pointing direction of said aerial and said predicted azimuth signals, means including said azimuth and range storage means responsive to the application of said digital signals to said azimuth and range storage means by said computer for producing azimuth and range gating signals respectively, means applying said azimuth and range gating signals to said gate means, and means responsive to video signals passed by said gate means for storing digital signals in said azimuth and range storage means corresponding to the actual azimuth and range coordinates respectively of said target, whereby said last mentioned digital signals can be applied to said computer at a time determined by said computer.

3. An automatic target tracking system of the type including a pulse radar apparatus having an aerial adapted for continuous rotation about a vertical axis, a source of azimuth pulses, and azimuth and range gate means connected to gate video signals to keep a target being tracked within a polar tracking frame having a center corresponding to predicted azimuth and range coordinate of said target, wherein the improvement comprises first and second digital counters, a digital computer connected to said first counter, means applying said azimuth pulses to said computer whereby at a time determined by said computer a setting signal is applied by said computer to said first counter, said setting signal being a function of the member of azimuth pulses which must occur thereafter before said azimuth and range gate means must be opened, first gate means for applying said azimuth pulses to said first counter, means responsive to the application of said setting signal to said first counter for opening said first gate means whereby said first counter produces an output signal when the number of azimuth pulses received thereby has a predetermined relationship to said setting signal, means applying said output signal of said first counter to said azimuth and range gate means for opening the azimuth gate therein, second gate means, a source of synchronizing pulses corresponding to transmitting pulses of said apparatus, means applying said synchronizing pulses to said second counter by way of said second gate means, means applying said output signal of said first counter to said second gate means for opening said second gate means, means responsive to a predetermined count of said second counter for closing said second gate means and azimuth and range gate means, and means responsive to video pulses passing through said azimuth and range gate means for closing said first gate means, whereby the count stored in said first counter corresponds to the actual azimuth of said target.

4. The systems of claim 3 wherein said means responsive to said video signals comprises a shift register having a predetermined number of stages, means applying said synchronizing pulses to said shift register as shifting pulses, means applying said video signals passed by said azimuth and range gate means to said shift register whereby the storage of pulses in said shift register depends upon the occurrence of video pulses during said polar tracking frame, differential amplifier means, first and second sum forming networks connected to the outputs of separate halves of the stages of said register, means applying the output of said first and second sum-forming networks to separate inputs of said differential amplifier means, and means applying the output of said differential amplifier to said first gate means whereby said first gate means is closed when the difference of the sums of the outputs of said sum forming networks changes its sign.

5. The system of claim 4 wherein said means responsive to said video signals further comprises a third digital counter, and said means applying the output of said amplifier to said first gate means comprises third gate means, said system further comprising means applying the output of said azimuth and range gate means to said third counter for counting the number of video pulses that have occurred for separate transmission pulses during said tracking frame, means for opening said third gate means when the count of said third counter is above a predetermined minimum, and means for closing said third gate means when the count of said third counter is above a predetermined maximum.

6. The system of claim 4 comprising means for applying the output of said differential amplifier to said computer for indicating that said first counter contains a count corresponding to the actual azimuth of said target.

7. The system of claim 4 wherein said shift register has $n$ stages comprising means for delaying the count of said first counter by $n/2$ pulses.

8. The system of claim 7 wherein said means for delaying the count of said first counter comprises means responsive to said output pulse of said first counter for closing said first gate means, and means responsive to a count of $n/2$ pulses by said second counter for opening said first gate means.

9. An automatic target tracking system of the type including a pulse radar apparatus having an aerial adapted for continuous rotation about a vertical axis, a source of azimuth pulses, and azimuth and range gate means connected to gate video signals to keep a target being tracked within a polar tracking frame having a center corresponding to predicted azimuth and range coordinates of said target, wherein the improvement comprises a register, a digital computer connected to said register, means applying said azimuth pulses to said computer whereby at a time determined by said computer a setting signal related to the predicted range of said target is applied to said register, a first digital counter connected to said register, a source of range counting pulses, a source of synchronizing pulses occurring prior to the transmission of a pulse by said radar apparatus, means responsive to said synchronizing pulse for setting said first counter from said register, means applying said range counting pulses to said first counter, said first counter providing opening and closing signals for controlling said azimuth and range gate means, a second digital counter connected to said computer, first gate means for applying said range counting pulses to said second counter, said first counter also providing a switching pulse that occurs a predetermined time after said closing signal, means responsive to video signals passing said azimuth and range gate means for opening said first gate means, and means responsive to said switching pulse for closing said first gate means, whereby the resultant count stored in said second counter is a function of the actual range of said target.

10. The system of claim 9 comprising bistable means connected to control said first gate means, wherein said means responsive to said switching pulse comprises means applying said switching pulse to one input of said bistable means, and said means responsive to said video signals comprises second gate means for applying said video signals to the other input of said bistable means, and means for holding said second gate means open for a predetermined number of successive transmission and reception periods of said radar system, whereby the resultant count in said second counter is a function of the sum of actual target ranges for said predetermined number of periods.

11. The system of claim 10 comprising a third digital counter, means for applying the output of said second gate means to said third counter for counting the number of video pulses occurring during each said period, and means responsive to a count of more than one video pulse during said period for closing said first gate means at a predetermined time.

12. The system of claim 11 comprising a fourth counter connected to the output of said third counter for counting the number of times a plurality of video pulses have occurred during a period, and means for applying an output pulse of said fourth counter to said computer when said last mentioned number exceeds a given value, whereby said computer is warned of possible errors in the count of said second counter.

13. The system of claim 11 wherein said means responsive to a count of more than one video pulse comprises a fourth digital counter connected to the output of said first gate means for producing an output pulse at said predetermined time, and gate means responsive to a count of more than one video pulse in said third counter for applying said output pulse of said fourth counter to said bistable circuit for closing said first gate means.

References Cited

UNITED STATES PATENTS 3,223,996  12/1965  Voles _____ 343—7.3 X

RODNEY D. BENNETT, *Primary Examiner.*

T. H. TUBBESING, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,403,396            September 24, 1968

Yftinus Frederik van Popta et al.

It is certified that error appears in the above identified patent and that said Letters Patent are hereby corrected as shown below:

Column 1, line 56, cancel "respectively". Column 6, line 17, "register" should read -- registered --; line 75, "movement" should read -- moment --. Column 7, line 13, "automaticallly" should read -- automatically --. Column 8, line 18, "syn" should read -- sync --; line 46, "stae" should read -- state --; line 62, "pulses" should read -- pulses. --. Column 10, line 29, after "azimuth" insert -- angle --; line 43, "director" should read -- direction --.

Signed and sealed this 31st day of March 1970.

(SEAL)
Attest:

Edward M. Fletcher, Jr.            WILLIAM E. SCHUYLER, JR.
Attesting Officer            Commissioner of Patents